A. BAYLEY.
Tea and Coffee Pot.
No. 66,936.                    Patented July 23, 1867.
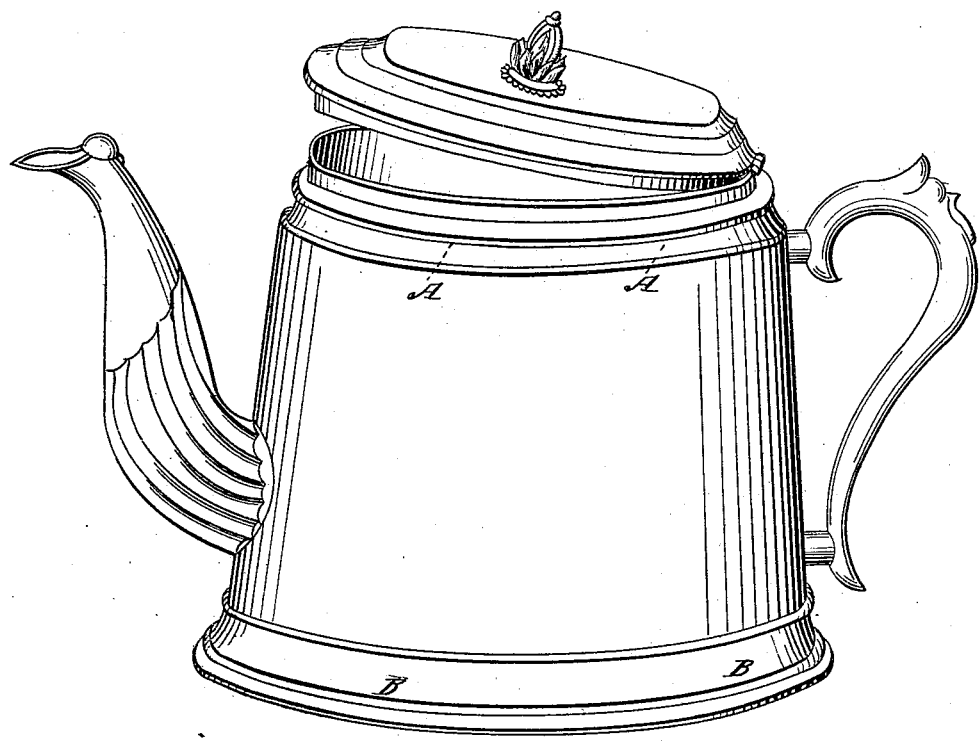
WITNESSES:                    INVENTOR:
Wm M Gooding                Alfred Bayley
H. B. Northrop

United States Patent Office.

ALFRED BAYLEY, OF NEWARK, NEW JERSEY.

Letters Patent No. 66,936, dated July 23, 1867.

IMPROVEMENT IN TEA AND COFFEE-POTS.

*The Schedule referred to in these Letters Patent and making part of the same.*

TO ALL WHOM IT MAY CONCERN:

Be it known that I, ALFRED BAYLEY, of the city of Newark, in the county of Essex, and State of New Jersey, have invented or made certain Improvements in the Making of Oval Tea and Coffee-Pots; and I do hereby declare the following to be a full and exact description of the same, reference being herein had to the drawings that accompany this specification, and which make part of the same.

The nature of my improvement consists in making the neck or breast of oval tin tea and coffee-pots, and also the base or foot, in one piece with the sides of the pot, forming the mouldings upon the piece itself.

The neck or breast of oval tea and coffee-pots has heretofore been formed by dies upon a piece of tin separate from the sides and soldered thereto, there having been great practical difficulties in the way of neatly, expeditiously, and profitably shaping oval pots with the neck or breast (A in the drawing) of the same piece as the side. Having practically overcome these difficulties, I therefore desire to secure the exclusive right to the same. In like manner an elaborate moulding is formed on the side piece at the bottom, (B in the drawing,) allowing the bottom of the pot to be lower down than when the moulding is soldered to the side piece, increasing the interior capacity without enlarging the exterior, also allowing the bottom to be, like that of a sauce-pan, adapted to being set upon the coals without loosening or leaking.

What I claim as new, and as of my improvement, and desire to secure by Letters Patent, is—

Necks or breasts of oval tin tea and coffee-pots, when the same are formed of or upon the same piece or pieces as the sides of the pot.

Also, a bottom moulding formed of or upon the same piece as the sides of oval tin tea and coffee-pots, when combined in forming a pot with the neck or breast formed on or of the same piece as the sides.

ALFRED BAYLEY.

Witnesses:
    W. M. GOODING,
    F. B. NORTHROP.